(12) United States Patent
Hsing et al.

(10) Patent No.: US 10,118,320 B2
(45) Date of Patent: Nov. 6, 2018

(54) BIOMIMETIC SKIN FOR AN ANIMATRONIC FIGURE AND OTHER APPLICATIONS

(71) Applicant: Disney Enterprises, Inc., Burbank, CA (US)

(72) Inventors: Alexander W. Hsing, Glendale, CA (US); Philip Jackson, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 106 days.

(21) Appl. No.: 14/715,416

(22) Filed: May 18, 2015

(65) Prior Publication Data

US 2016/0339349 A1   Nov. 24, 2016

(51) Int. Cl.
| | | |
|---|---|---|
| *A63H 9/00* | (2006.01) | |
| *B29C 39/38* | (2006.01) | |
| *B29C 65/48* | (2006.01) | |
| *B29C 39/02* | (2006.01) | |
| *B29K 21/00* | (2006.01) | |
| *B29L 9/00* | (2006.01) | |
| *B29L 31/00* | (2006.01) | |

(52) U.S. Cl.
CPC .............. *B29C 39/38* (2013.01); *A63H 9/00* (2013.01); *B29C 39/026* (2013.01); *B29C 65/48* (2013.01); *B29K 2021/00* (2013.01); *B29K 2995/0046* (2013.01); *B29L 2009/00* (2013.01); *B29L 2031/7532* (2013.01)

(58) Field of Classification Search
CPC .............. A63H 3/00; A63H 3/02; A63H 9/00
See application file for complete search history.

(56) References Cited

U.S. PATENT DOCUMENTS

| | | | | |
|---|---|---|---|---|
| 3,274,046 A | * | 9/1966 | Shannon | B29C 69/001 156/79 |
| 3,849,238 A | * | 11/1974 | Gould | A61L 15/24 602/46 |
| 4,481,001 A | * | 11/1984 | Graham | G09B 23/285 434/267 |
| 4,583,247 A | * | 4/1986 | Fingerhut | A41D 27/06 2/272 |
| 5,444,881 A | * | 8/1995 | Landi | A61G 5/1043 5/708 |
| 5,775,916 A | * | 7/1998 | Cooper | G09B 23/285 434/267 |
| 6,061,830 A | * | 5/2000 | Geller | A41G 7/00 2/159 |
| 7,186,212 B1 | * | 3/2007 | McMullen | A63H 3/003 600/38 |
| 8,221,129 B2 | * | 7/2012 | Parry | G09B 23/30 434/272 |
| 8,568,642 B2 | * | 10/2013 | Jackson | B29C 39/10 264/277 |

(Continued)

*Primary Examiner* — Gene Kim
*Assistant Examiner* — Alyssa Hylinski
(74) *Attorney, Agent, or Firm* — Dorsey & Whitney LLP

(57) ABSTRACT

A biomimetic skin for an animatronic figure and other applications is provided. The biomimetic skin may include an outer layer having a surface texture, and an inner layer attached to the outer layer. The inner layer may include a compressible cellular material. The outer layer may move correspondingly with the inner layer such that as the inner layer is moved the outer layer moves.

22 Claims, 5 Drawing Sheets

(56) References Cited

U.S. PATENT DOCUMENTS

| | | | | |
|---|---|---|---|---|
| 9,700,150 B2* | 7/2017 | Waters | ............ | A47D 7/00 |
| 2007/0232185 A1* | 10/2007 | Wong | ............ | A63H 3/36 |
| | | | | 446/268 |
| 2008/0044621 A1* | 2/2008 | Strauss | ............ | B22F 3/1112 |
| | | | | 428/108 |
| 2009/0235943 A1* | 9/2009 | Sugai | ............ | A41G 3/0041 |
| | | | | 132/54 |
| 2010/0056715 A1* | 3/2010 | Wang | ............ | A63H 9/00 |
| | | | | 524/588 |
| 2013/0280493 A1* | 10/2013 | Jackson | ............ | A63H 9/00 |
| | | | | 428/172 |
| 2013/0288565 A1* | 10/2013 | McMullen | ............ | A63H 3/365 |
| | | | | 446/321 |

* cited by examiner

BIOMIMETIC SKIN FOR AN ANIMATRONIC FIGURE AND OTHER APPLICATIONS

TECHNICAL FIELD

This invention relates generally to mannequins and/or animatronics, and more specifically to creating realistic skin for mannequins and animatronic figures or for use with robotics or other applications in which skin or similar coverings are applied.

BACKGROUND

Durable, flexible materials, such as plastics and rubbers, are used in many applications to create coverings or skins that are applied over an internal physical support structure or skeleton. For example, skins or skin systems are used to create realistic models of humans, animals, and fantasy characters, and when combined with robotics, such models can accurately simulate live persons or animals.

The design of such skins presents a particular unique challenge. Specifically, the skin must be robust enough to withstand prolonged used and exposure to environmental conditions. The skin must also be realistic in appearance, movement, and texture to accurately imitate the person or animal it resembles. On the other hand, the skin must also be easily formed and easy to handle and attach to a physical support structure or skeleton. To create a realistic appearance and deformation, soft elastomers are typically used to create skin. However, these elastomers tend to buckle and look unnatural when moved by a robotic joint, further these elastomers can be quite heavy, making it difficult to create large skin sections for an animatronic.

The present disclosure generally provides a biomimetic skin that offers improvements or an alternative to existing arrangements.

BRIEF SUMMARY

The present disclosure generally provides a biomimetic skin for an animatronic figure and other applications. In one embodiment, the biomimetic skin may include an outer layer having a surface texture, and an inner layer attached to the outer layer, the inner layer including a compressible cellular material. The outer layer moves correspondingly with the inner layer such that as the inner layer is moved the outer layer moves, creating a realistic skin appearance.

Embodiments of the present disclosure may include a multi-layer artificial skin. In some embodiments, the artificial skin may include a nonporous dermis layer and a porous hypodermis layer connected to the dermis layer, the hypodermis layer including a cellular structure. Movement of the cellular structure may correspondingly move the dermis layer.

Embodiments of the present disclosure may include a skin for an animatronic figure. In some embodiments, the skin may include an outer layer made from a synthetic material and an inner layer attached to the outer layer, the inner layer made from a textile material.

Embodiments of the present disclosure may include an animatronic figure. In some embodiments, the animatronic figure may include a support frame and at least one biomimetic skin section attached to the support frame. The biomimetic skin section may include a first layer and a second layer. The second layer may be positioned at least partially between the first layer and the support frame, and at least partially connected to each of the first layer and the support frame. The second layer may include a cellular structure.

Embodiments of the present disclosure may include a method of fabricating a multi-layered biomimetic skin. In some embodiments, the method may include forming a skin mold having a cavity defined by a bottom wall and sidewalls extending upward from the bottom wall, filling a first material for an exterior skin layer into the skin mold to occupy at least a portion of the cavity, and attaching a second material for an interior skin layer to the first layer. The bottom wall may include a texture region.

BRIEF DESCRIPTION OF THE DRAWINGS

The accompanying drawings, which are incorporated into and constitute a part of the specification, illustrate examples of the disclosure and, together with the general description above and the detailed description below, serve to explain the principles of these examples.

DETAILED DESCRIPTION

The present disclosure generally provides a biomimetic skin. The biomimetic skin can be used in a variety of applications, for example, covering portions of an animatronic figure, a costume worn by a human performer, a human performer, a mannequin, a robot, or the like. The biomimetic skin has a realistic texture, appearance, and also moves in a realistic manner to simulate the characteristics of real skin. The biomimetic skin includes an outer layer and an inner layer, each of the layers moving correspondingly with each other. In a particular example, the outer layer is an elastomeric material and the inner layer includes a cellular structure or other three-dimensional porous structure that behaves (mechanically) similarly to the elastomeric material, but has a lighter weight and density than the elastomeric material.

The combination of the outer layer and the inner layer imitates the texture/color and the thickness of real skin. The outer layer can be optimized for appearance and color and the inner layer can be optimized for thickness, attachment characteristics (for attaching to a structure), and compression and/or flexibility characteristics. This allows the skin can to be created without requiring compromises between weight, thickness, appearance, mechanical performance, and so on. Thus, due to the dual-layer configuration, the biomimetic skin provides an artificial skin that is lightweight and flexible, allowing it to be more easily moved by a human or motor-driven animatronic figure, performer, or walk around character and/or require a less rigid or reduced weight support structure to support the skin, as compared to conventional skins. For example, the dual-layered biomimetic skin is 50-80% lighter, and in some embodiments is 61% lighter as compared to conventional single-layered skins, such as single layer styrene-butadiene rubber skin.

Figure 1:
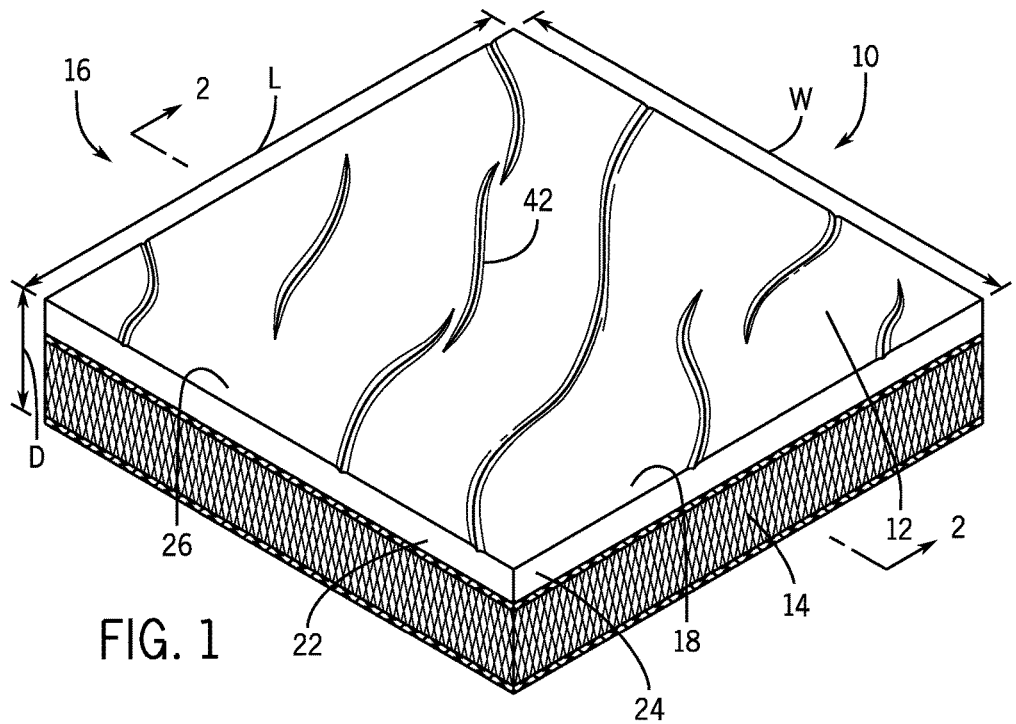
FIG. 1 is a top front isometric view of a biomimetic skin in accordance with an embodiment of the present disclosure.

Referring to FIG. 1, a biomimetic skin 10 is formed from a plurality of layers, each of the plurality of layers providing realistic characteristics simulating real skin. As shown, the biomimetic skin 10 includes an outer layer 12 and an inner layer 14 attached to the outer layer 12 and/or extending substantially parallel to at least a portion of the outer layer 12. The outer layer 12 and the inner layer 14 may collectively define a length L, a width W, and a depth D of the biomimetic skin 10. In some embodiments, each of the length L and the width W may be greater than the depth D, which may be consistent or vary along a length of the biomimetic skin 10.

As shown in FIG. 1, the biomimetic skin 10 may take the form of a generally cuboid skin section 16. In such embodiments, the length L and the width W may be substantially equal; however, it is contemplated that the skin section 16 may have substantially any dimensional configuration to accommodate substantially any application for, or position of, the skin section 16. Briefly, in some embodiments, the length L may be greater than the width W, or vice-versa. Similarly, the depth D may vary to simulate thicker and/or thinner skin. The biomimetic skin 10 may be formed from a variety of materials and configurations to allow the biomimetic skin 10 to be resiliently deformable. For example, the biomimetic skin 10 may be configured such that the outer layer 12 moves correspondingly with the inner layer 14. In such embodiments, as the inner layer 14 is moved (e.g., compressed), the outer layer 12 may move (e.g., compress) correspondingly with the inner layer 14. In some embodiments, the biomimetic skin 10 may be stretchable in at least one lateral direction, and may be compressible in a lateral and transverse direction.

Figure 2A:
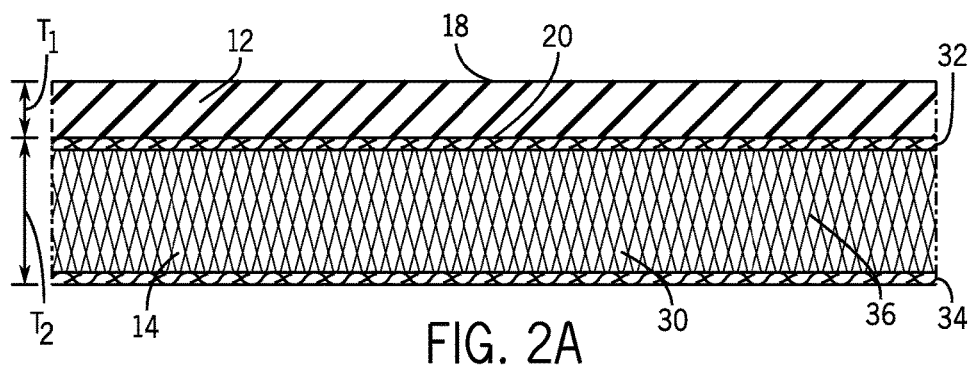
FIG. 2A is a cross-sectional view of the biomimetic skin of FIG. 1 taken along line 2-2 of FIG. 1 in accordance with an embodiment of the present disclosure.
Figure 3:
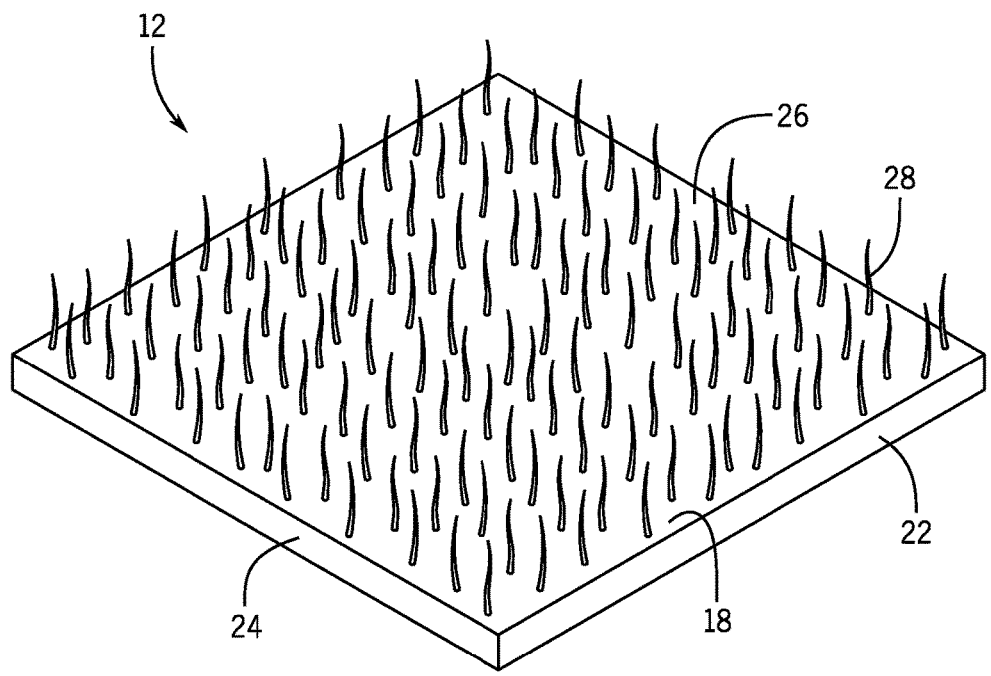
FIG. 3 is a top front isometric view of an outer layer of a biomimetic skin having hair attached thereto in accordance with an embodiment of the present disclosure.
Figure 4:
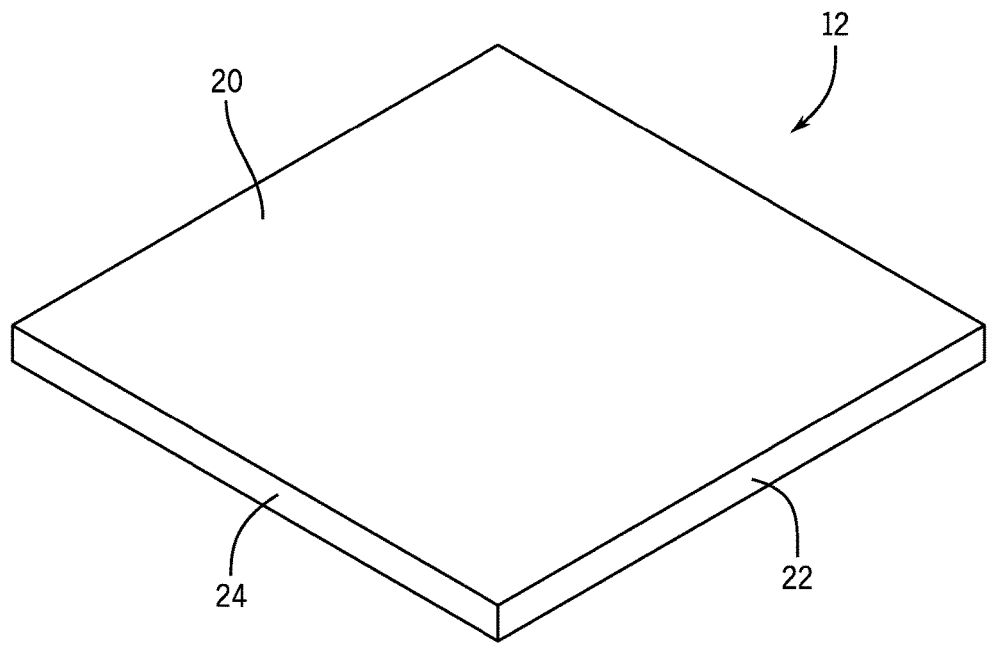
FIG. 4 is a bottom rear isometric view of an outer layer of a biomimetic skin in accordance with an embodiment of the present disclosure.

Referring to FIGS. 3 and 4, the outer layer 12, which may be referred to as a dermis or first layer, may be formed by two major surfaces (e.g., a top surface 18 and a bottom surface 20) separated by a peripheral wall 22. The peripheral wall 22, which may include four generally planar sidewalls 24 extending substantially perpendicular to the top and bottom surfaces 18, 20, may define a thickness $T_1$ of the outer layer 12 (see FIG. 2A). The top surface 18 may include a surface texture 26 for mimicking the general appearance of human, animal, or other skin, such as raised portions, depressions or wrinkles, or the like (see FIGS. 1 and 3). Feathers, hair, fur, or other fibrous material 28 may be connected to the outer layer 12 (e.g., to the top surface 18) to further simulate the look and feel of various skins (see FIG. 3). The fibrous material 28 may be configured to simulate the texture, color, feel, and movement of hair or fur, and may extend away from the outer layer 12. The outer layer 12 may be formed from any resiliently deformable material, such as rubber (e.g., styrene butadiene rubber), silicone, urethane, latex, or other synthetic material, having an extra soft to medium soft hardness and high elongation properties. For example, the outer layer 12 may have a shore hardness between 50 Shore A and 20 Shore OOO, and preferably between 25 Shore A and 50 Shore OO. The outer layer 12 may be permeable or nonporous, and/or resiliently deformable in at least two directions. In some embodiments, the outer layer 12 may vary in shore hardness and thickness depending on the desired characteristics of the biomimetic skin 10 in various applications. For example, the biomimetic skin 10 may be harder and thicker in high stretch or stress areas and softer and thinner in low stretch or stress areas.

Figure 2B:
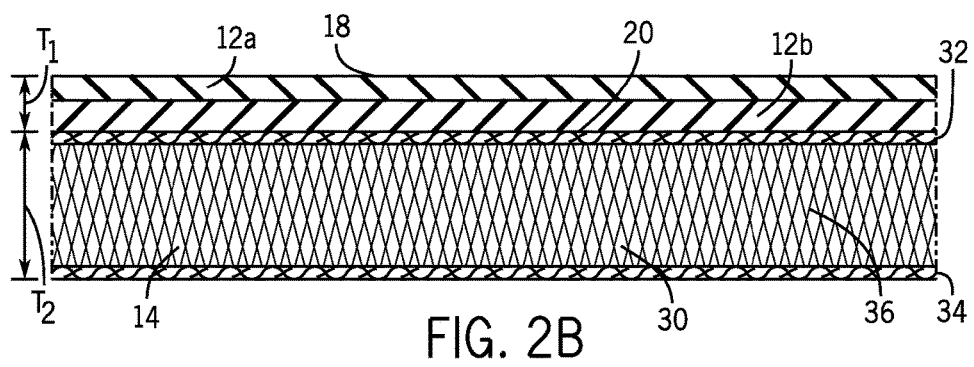
FIG. 2B is a cross-sectional view of a biomimetic skin having a sub-layered outer layer in accordance with an embodiment of the present disclosure

As illustrated in FIG. 2B, the outer layer 12 may be formed from two or more sublayers depending on the application and the desired properties of the outer layer 12. For example, in the embodiment shown in FIG. 2B, the outer layer 12 is formed from an outer sublayer 12A and an inner sublayer 12B. In such embodiments, the inner layer 14 is attached to the inner sublayer 12B. The inner sublayer 12B, which may be formed from a first material, generally provides the bulk dimensions and properties of the outer layer 12 (e.g., a majority of the thickness $T_1$ of the outer layer 12). The outer sublayer 12A, which may be formed from a second material, generally provides the surface texture 26 of the outer layer 12. In this manner, the outer sublayer 12A and/or the inner sublayer 12B may be premade in a variety of shapes, sizes, colors, surface textures, and/or materials. Accordingly, the outer sublayer 12A and the inner sublayer 12B may be mixed and matched to achieve a desired look and/or behavior of the outer layer 12. In some embodiments, the inner sublayer 12B is cut or formed from a readily available commercial product, and the outer sublayer 12A is custom made or formed for a particular application.

Figure 5:
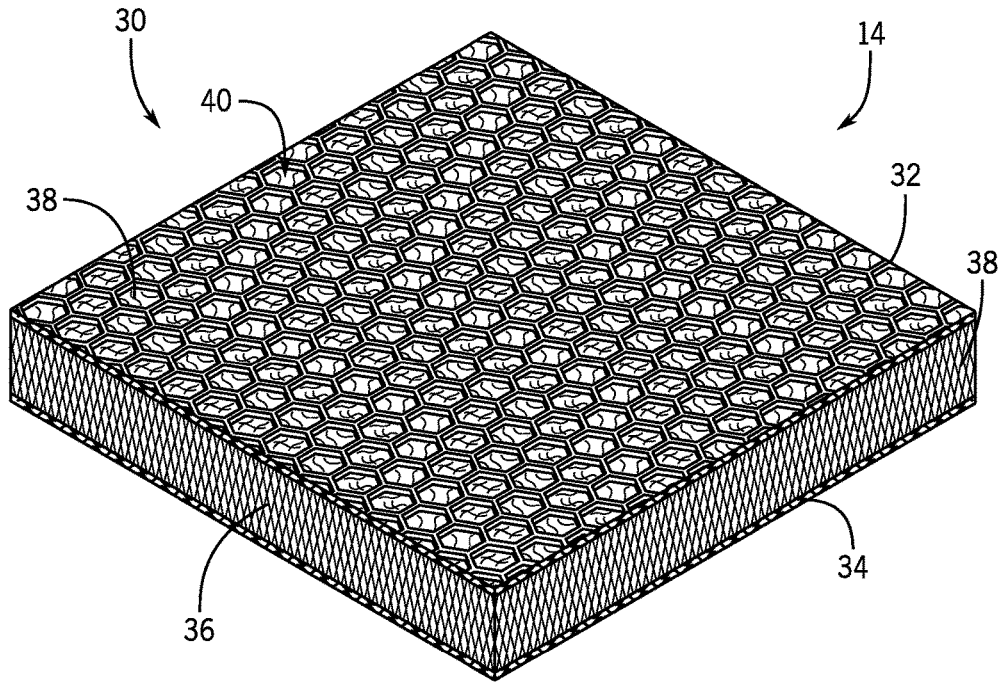
FIG. 5 is a top front isometric view of an inner layer of a biomimetic skin in accordance with an embodiment of the present disclosure.
Figure 6:
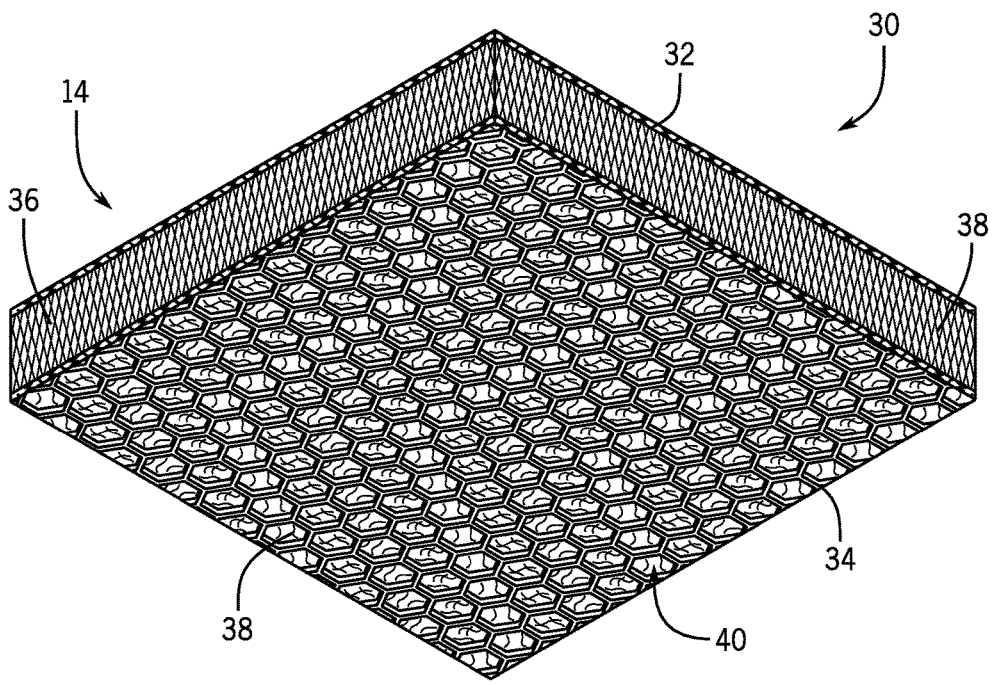
FIG. 6 is a bottom rear isometric view of the inner layer of FIG. 5 in accordance with an embodiment of the present disclosure.

With reference to FIGS. 5 and 6, the inner layer 14, which may be referred to as a hypodermis or second layer, may be a textile or fabric material having a cellular material 30 or structure. Specifically, the inner layer 14 may be formed from substantially any resiliently deformable textile material, such as three dimensional spacer fabric. The inner layer 14 may be lightweight and easily deformable in a plurality of directions. Like the outer layer 12, the inner layer 14 may be porous and/or resiliently deformable in at least two directions. The inner layer 14 generally defines the thickness and movement characteristics of the biomimetic skin 10. In embodiments wherein the inner layer 14 is formed from a lightweight textile material, the biomimetic skin 10 is lighter and moves easier compared to conventional skins.

The cellular material 30 forms a three dimensional porous structure and is generally lightweight, compressible and includes an upper surface 32, a lower surface 34, and a cellular portion 36 made from one or more flexible or compressible elements 38 positioned between the upper surface 32 and the lower surface 34. In some embodiments, the compressible elements 38 include a plurality of spacer or monofilament fibers. Each of the compressible elements 38 connects to at least one of the upper surface 32 and the lower surface 34 of the cellular material 30. In some embodiments, the cellular material 30 may be connected to the bottom surface 20 of the outer layer 12 (see FIG. 2A). For example, the upper surface 32 of the cellular material 30 may connect to the bottom surface 20 of the outer layer 12. In other embodiments, the cellular material 30 may not include the upper surface 32 and each of the compressible elements 38 connects directly to the bottom surface 20 of the outer layer 12.

Along with providing compressibility properties to the inner layer 14, the porous structure of the cellular material 30 also improves longevity of the biomimetic skin 10 by allowing gases, such as air, to move through the inner layer 14 which may be used to cool and/or heat the inner layer 14 and/or the outer layer 12. As one example, cool air may be circulated through the inner layer 14 to reduce or mitigate delamination of the inner layer 14 and the outer layer 12 under high heat conditions. In some embodiments, the porous structure may also provide an insulating layer to shield or protect sensitive internal parts or persons from extreme temperature environments.

The inner layer 14 provides structure and/or support for the outer layer 12. For example, when connected to the outer layer 12, the inner layer 14 may be operable to stop a rip or tear in the outer layer 12 from propagating completely through the outer layer 12. Specifically, in embodiments wherein the cellular material 30 is connected to the bottom surface 20 of the outer layer 12, the cellular material 30 provides sufficient structure to reduce the likelihood of the bottom surface 20 shearingly separating. As such, the cellular material 30 may be operable to reduce or mitigate the amount of normal strain and/or shear strain acting on the bottom surface 20 of the outer layer 12. Thus, any rip or tear in the top surface 18 of the outer layer 12 remains in the top surface 18. In this manner, any rips or tears in the outer layer 12 may easily be repaired, thus reducing maintenance time and overall costs associated with the biomimetic skin 10.

With continued reference to FIGS. 5 and 6, each of the upper and lower surfaces 32, 34 of the inner layer 14 may be a mesh material having a hexagonal lattice weave. As illustrated, a plurality of hexagonal apertures 40 may be defined within the upper and lower surfaces 32, 34. The hexagonal apertures 40 reduce the weight of the inner layer 14 and allow the inner layer 14 to resiliently deform in at least one direction. The hexagonal apertures 40 also assist in securing the biomimetic skin 10 to an animatronic figure, support structure, or other device, as explained below.

In some embodiments, the inner layer 14 may be prefabricated or ad hoc customized to increase or customize its flexibility characteristics on a global or local scale. For example, a series of incisions (i.e., relief cuts) may be made within the inner layer 14 (e.g., the upper surface 32 and/or the lower surface 34) to pre-weaken the inner layer 14 to a predetermined flexibility. Depending on a particular application, the relief cuts may be made uniformly throughout the inner layer 14 or the relief cuts may be concentrated locally to increase or customize the flexibility of the inner layer on a global scale or in a particular area, respectively. For example, an inner layer 14 destined for use in a shoulder region of an animatronic figure may be prefabricated to provide 20-40° greater flexibility compared to an inner layer 14 destined for use in a generally stationary region of an animatronic figure. Similarly, an inner layer 14 covering both movable and non-movable regions of an animatronic figure may be locally weakened to provide increased flexibility in the portion of the inner layer 14 covering the movable region of the animatronic figure.

Referring now to FIGS. 2A and 2B, the inner layer 14 has a thickness $T_2$ collectively defined by the upper surface 32, the lower surface 34, and the cellular portion 36. As illustrated, the thickness $T_2$ of the inner layer 14 may be greater than the thickness $T_1$ of the outer layer 12. In some embodiments, at least one of the thicknesses $T_1$, $T_2$ may be variable along a length of the outer layer 12 or the inner layer 14, respectively, to better simulate non-uniform skin, as explained hereafter.

Figure 7:
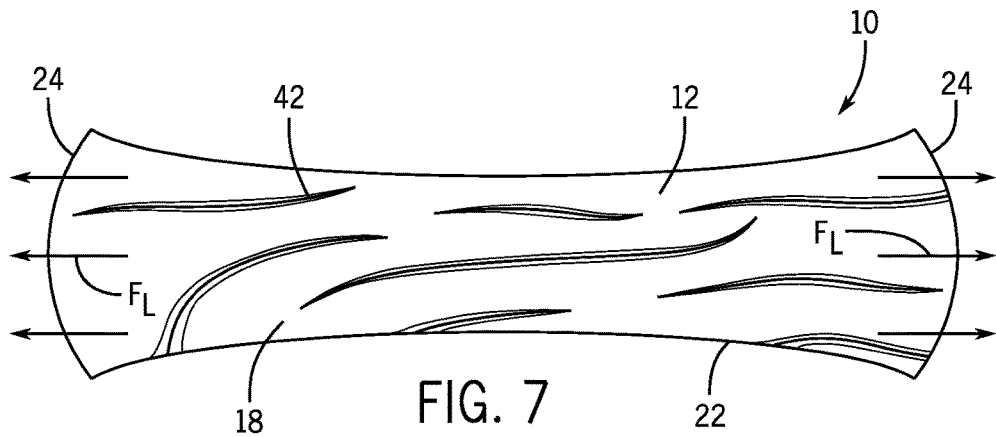
FIG. 7 illustrates a biomimetic skin stretched in a lateral direction in accordance with an embodiment of the present disclosure.
Figure 8:
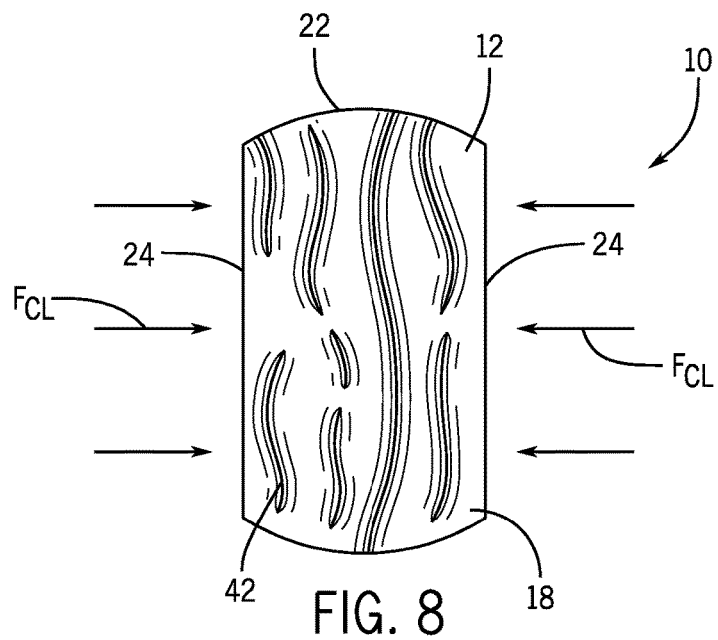
FIG. 8 illustrates a biomimetic skin compressed in a lateral direction in accordance with an embodiment of the present disclosure.
Figure 9:
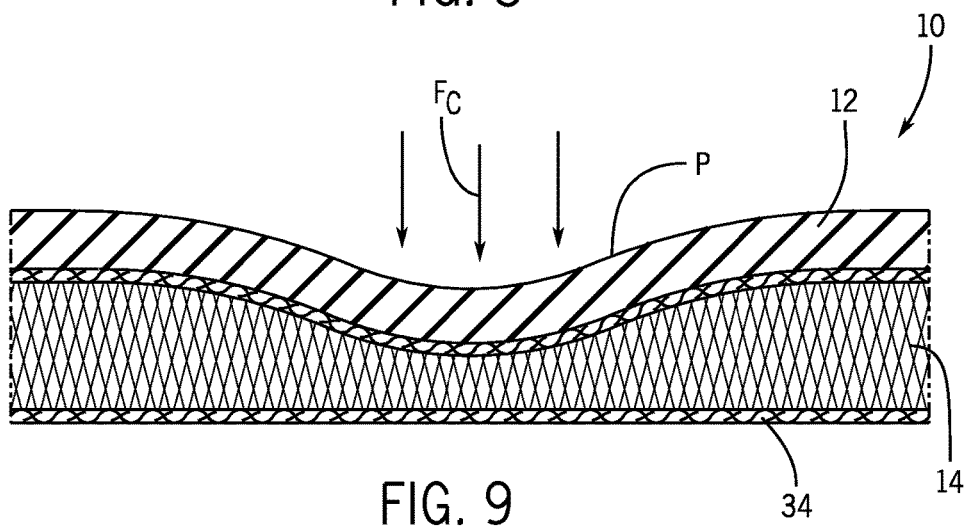
FIG. 9 illustrates a biomimetic skin compressed in a transverse direction in accordance with an embodiment of the present disclosure.

With reference to FIGS. 7-9, the biomimetic skin 10 appears and feels more realistic as compared to imitation conventional skins. Additionally, the multiple layers of the biomimetic skin 10 move correspondingly with one another to simulate the look and feel of real skin. In some embodiments, the outer layer 12 generally mimics the color and surface texture of real skin, as well as the deformability of real skin in a lateral direction. In such embodiments, the thickness of the outer layer 12 drives the overall thickness and movement characteristics of the biomimetic skin 10, thus allowing the biomimetic skin 10 to be noticeably lighter than conventional skins.

The biomimetic skin 16 generally mimics the thickness and deformability of real skin in lateral and transverse directions. For example, the outer layer 12 and the inner layer 14 may have high elongation and compressive properties such that the biomimetic skin 10 may be stretched (see FIG. 7) or compressed (see FIG. 8) in a lateral direction. As illustrated in FIG. 7, the biomimetic skin 10 may be stretched in a lateral direction by a lateral force $F_L$ pulling opposing sidewalls 24 of the peripheral wall 22 of the outer layer 12 away from each other. As shown, the lateral force $F_L$ extends or stretches the biomimetic skin 10 in the direction of the lateral force $F_L$. Simultaneously, the biomimetic skin 10 contracts in a transverse or lateral direction relative to the lateral direction of the lateral force $F_L$. As such, in a stretched state, the biomimetic skin 10 may have a generally hourglass or bowtie shape, with the biomimetic skin 10 wider adjacent the opposing sidewalls 24 receiving the lateral force $F_L$, and narrowing between the opposing sidewalls 24 receiving the lateral force $F_L$.

Similarly, as illustrated in FIG. 8, the biomimetic skin 10 may be compressed in a lateral direction by a compressive lateral force $F_{CL}$ compressing opposing sidewalls 24 of the peripheral wall 22 towards each other. In such embodiments, the compressive lateral force $F_{CL}$ compresses the biomimetic skin 10 in the direction of the compressive lateral force $F_{CL}$. Under the strain of the compressive lateral force $F_{CL}$, the biomimetic skin expands or stretches in a transverse or lateral direction relative to the direction of the compressive lateral force $F_{CL}$. As such, in a compressed state, the biomimetic skin 10 may have a generally biconic shape, with the biomimetic skin narrower adjacent the opposing sidewalls 24 receiving the compressive lateral force $F_{CL}$, and widening between the opposing sidewalls 24 receiving the compressive lateral force $F_{CL}$.

In both the stretched and compressed embodiments, the outer layer 12 simulates the general appearance of real skin in a similarly stretched or compressed state. For example, in a compressed state (see FIG. 8), the outer layer 12 may be operable to define folds or creases 42 in its top surface 18 that realistically look and behave like corresponding folds or creases in real skin. In a stretched state (see FIG. 7), the creases 42 may disappear or otherwise be reduced in size and/or number in the top surface 18 of the outer layer 12. In some embodiments, the outer layer 12 may include other visual characteristics of real skin (e.g., veins, freckles, or other melanocytic features) that appear and behave realistically in stretched and compressed states. For example, veins (not shown) may be positioned within the outer layer 12 between the top surface 18 and the bottom surface 20 (e.g., immediately below the top surface 18). During compression and/or stretching of the biomimetic skin in a lateral and/or transverse direction, the veins may disappear or otherwise be reduced in size and/or number. Likewise, freckles and other melanocytic features may behave similarly in stretched and/or compressed states (e.g., disappear, reduce in size and/or number, decrease in pigment concentration, etc.). The movement and/or appearance of the outer layer 12 depends upon the deformability of the inner layer 14. Because of the resilient deformability of the inner layer 14, the outer layer 12 may stretch (see FIG. 7), compress (see FIG. 8), undulate (see FIG. 9), or otherwise bend or fold in a plurality of directions limited only by the deformability of the inner layer 14.

With reference to FIG. 9, along with lateral elongation and compressive properties, the inner layer 14 may be compressible in a transverse direction to simulate transverse deformation of real skin. As illustrated, the biomimetic skin 10 may be compressed in a transverse direction by a compressive force $F_C$ compressing the outer layer 12 towards the lower surface 34 of the inner layer 14. The inner layer 14 may be resiliently deformable such that the thickness $T_2$ of the inner layer 14 decreases generally adjacent (e.g., below) a load point P of the compressive force $F_C$. In some embodiments, the outer layer 12 may have an arcuate shape adjacent the load point P. For example, the outer layer 12 may extend concavely towards the lower surface 34 of the inner layer 14 adjacent load point P. Additionally or alternatively, the outer layer 12 may compress in a transverse direction such that the thickness $T_1$ of the outer layer 12 decreases generally adjacent (e.g., below) the load point P of the compressive force $F_C$. In some embodiments, the inner layer 14 and the outer layer 12 may compress in a transverse direction as the biomimetic skin 10 is stretched in a lateral direction, thus simulating thinning of real skin under similar circumstances. In such embodiments, the thickness $T_2$ of the inner layer 14 may be operable to limit the amount of stretching of the biomimetic skin 10 in a lateral direction. The thickness $T_2$ of the inner layer 14 is selected to define realistic deformation boundaries of the biomimetic skin 10 in a plurality of directions. As such, the thickness $T_2$ of the inner layer 14 is important for a realistic simulation of real skin.

Figure 10:
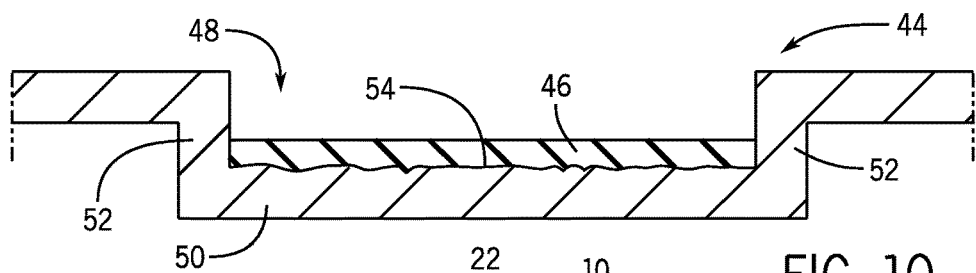
FIG. 10 is a cross-section view of a skin mold used to create a biomimetic skin in accordance with an embodiment of the present disclosure.

The biomimetic skin 10 may be fabricated from a variety of methods, such as cold casting, compression molding, heat setting, or other fabrication methods. For example, the biomimetic skin 10 may be fabricated by forming a skin mold 44, filling a first material 46 for the outer layer 12 into the skin mold 44, and attaching a second material (not shown) for the inner layer 14 to the first material 46. With reference to FIG. 10, the skin mold 44 may include a cavity 48 defined by a bottom wall 50 and generally parallel sidewalls 52 extending from the bottom wall 50. The bottom wall 50 may include a texture surface 54 operable to imprint a surface texture 26 on the first material 46. The first material 46 may be poured or otherwise placed into the skin mold 44 to occupy at least a portion of the cavity 48. The second material (not shown) may be attached to the first material 46 before or after the first material 46 is removed from the skin mold 44. For example, the first material 46 may be cooled to a cooling temperature and then removed from the skin mold 44. The cooling temperature may be the temperature at which the shape of the first material 46 is substantially set. The first material 46 may be heated to a forming temperature, and the second material is then bonded to the first material 46. In some embodiments, heating the first material 46 to the forming temperature may include heating a surface (e.g., the bottom surface 20 of the outer layer 12) of the first material 46 sufficiently to at least partially melt a portion of the surface. The second material may then be pressed into the melted portion of the first material 46 such that at least a portion of the second material is embedded in the first material 46 once the first material 46 cools.

Additionally or alternatively, the biomimetic skin 10 may be fabricated by assembling prefabricated outer and inner layers 12, 14 together. In an exemplary embodiment, a prefabricated outer layer 12, whether with or without surface texture 26, is attached to a prefabricated inner layer 14 using an adhesive. The adhesive, which may be glue, cement, epoxy, or any other substance operable to bind surfaces of materials together, is applied to a surface of at least one of the outer layer 12 and the inner layer 14. For example, the adhesive may be applied to the bottom surface 20 of the outer layer 12 and/or the upper surface 32 of the inner layer 14 using a variety of techniques, including spray and roll-on. To set the adhesive and secure the outer layer 12 and the inner layer 14 together, the outer layer 12 and the inner layer 14 may be pressed together, with or without heat. Each fabrication method discussed above may be used to secure the outer sublayer 12A and the inner sublayer 12B of the outer layer 12 together.

In this manner, multiple skin sections 16 of the biomimetic skin 10 can be fabricated so as to be assembled together at a subsequent time or in a different locale, if desired. For example, skin sections 16 may be mass produced having a standard shape and size to increase efficiency in operation and assembly. A plurality of skin sections 16 may be attached together to form a skin covering 56 for an animatronic figure, a mannequin, a prosthetic, or any other application. Skin sections 16 may be fabricated that snap, lock, or otherwise fit into designated locations on an animatronic figure or prosthetic. In such embodiments, individual skin sections 16 may be easily repaired or replaced.

The outer layer 12 and the inner layer 14 allow the biomimetic skin 10 to better simulate real skin in, for example, texture, appearance, and movement compared to conventional skins. For instance, because the biomimetic skin 10 includes at least two layers (e.g., the outer layer 12 and the inner layer 14), the biomimetic skin 10 provides an artificial skin for movable and non-movable applications that does not compromise on simulation characteristics compared to conventional skins. For example, the outer layer 12 and the inner layer 14 may each be configured, specialized, or otherwise optimized so the biomimetic skin 10 does not compromise on appearance or weight. Similarly, because the outer layer 12 generally represents the color and surface texture, but is not required for the thickness and/or movement characteristics of the biomimetic skin 10, the function and appearance characteristics of the biomimetic skin 10 is divorced from a single layer, allowing both layers to be optimized for a particular function. Because conventional skins have a single layer, many compromises need to be made in the conventional skins with respect to appearance and/or movement, such that either or both are not realistic.

Figure 11:
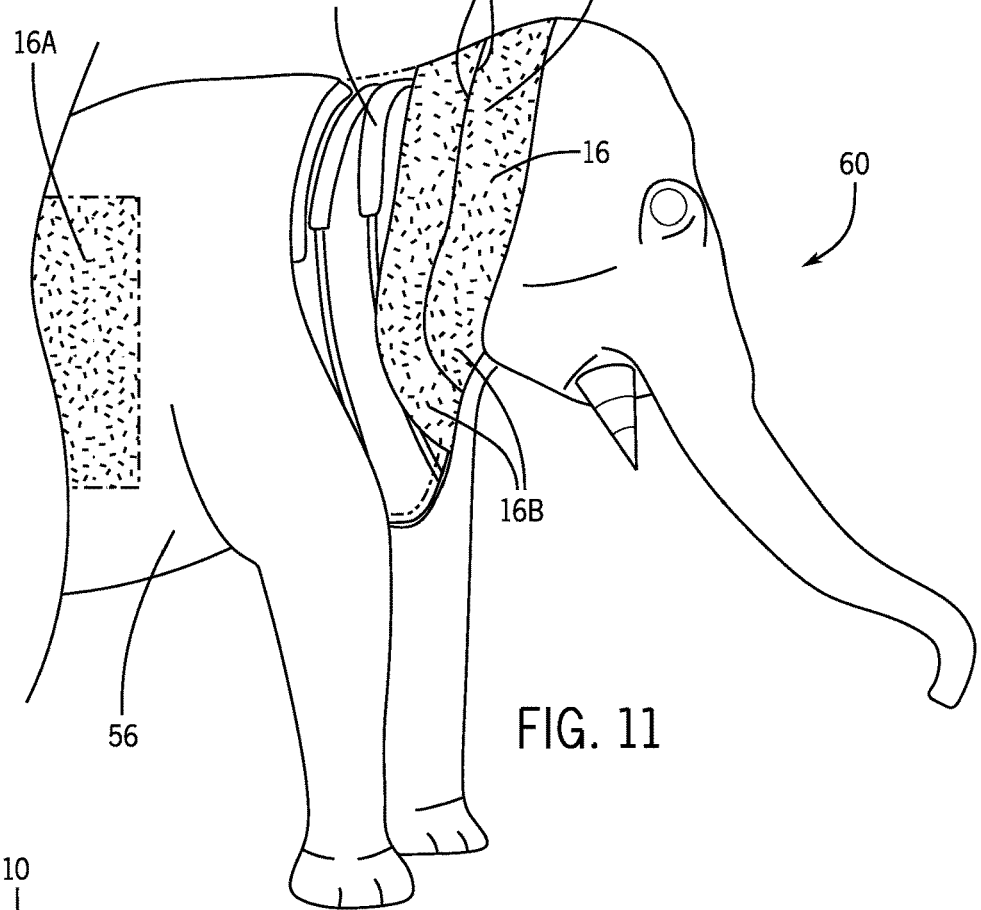
FIG. 11 is a perspective view of an animatronic figure including a biomimetic skin in accordance with an embodiment of the present disclosure.

Referring to FIG. 11, the biomimetic skin 10 may be attached to an animatronic figure, a mannequin, a prosthetic, or any other movable or non-movable device wherein the look and feel of real skin is desired. For example without limitation, the biomimetic skin 10 may be attached to a support frame 58 of an animatronic FIG. 60. The support frame 58 may be movable in at least one direction, and movement of the support frame 58 may move the biomimetic skin 10. The biomimetic skin 10 may stretch, fold, and compress in a variety of directions to simulate real skin. When attaching the biomimetic skin 10 to the support frame 58, the inner layer 14 of the biomimetic skin 10 may be positioned at least partially between the outer layer 12 and the support frame 58 (see FIG. 12). In some embodiments, the inner layer 14 may be at least partially connected to each of the outer layer 12 and the support frame 58.

Figure 12:
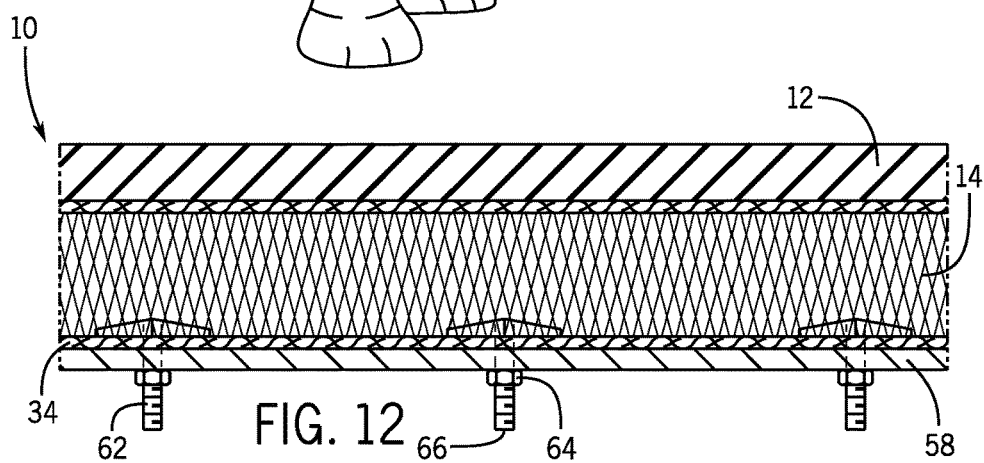
FIG. 12 is a cross-section view of a biomimetic skin attached to a support frame of an animatronic figure in accordance with an embodiment of the present disclosure.

Referring to FIG. 12, the biomimetic skin 10 may be attached to the support frame 58 using fasteners 62. The fasteners 62 may extend through the lower surface 34 of the inner layer 14 (e.g., through a hexagonal aperture 40 of the lower surface 34) to connect the lower surface 34 of the inner layer 14 to the support frame 58. The fasteners 62, which may be threaded, may extend through the support frame 58 and a retention nut 64 may be threaded onto a distal end 66 of each fastener 62. Additionally or alternatively, the fasteners 62 may be threaded into the support frame 58. In some embodiments, the fasteners 62 may be formed integrally with the support frame 58 to form outwardly extending hooks (not shown). In such embodiments, each hook may be secured within a hexagonal aperture 40 of the lower surface 34. Although the figures illustrate fasteners 62 connecting the biomimetic skin 10 to the support frame 58, the biomimetic skin 10 may be attached to the support frame 58 using other suitable attachment or securing means, including without limitation corresponding retention features, adhesive, heat or sonic welding, or hook and loop fasteners.

As illustrated in FIG. 11, multiple skin sections 16 may be attached to the support frame 58 to form a skin covering 56 of the animatronic FIG. 60. The multiple skin sections 16 may be connected together to form a generally seamless skin covering 56 at least partially covering the support frame 58 of the animatronic FIG. 60. For example, corresponding peripheral walls 22 of adjacent skin sections 16 may abut against each other to form the skin covering 56. In some embodiments, the corresponding peripheral walls 22 may be secured to each other using adhesive or corresponding retention features, such as through tongue and groove, mortise and tenon, dovetail joint, or other assembly structure. Furthermore, the corresponding peripheral walls 22 may be at least partially melted and pressed together to at least partially bond the corresponding peripheral walls 22 together.

Each of the skin sections 16 may be uniform in size and shape, or, in some embodiments, the skin sections 16 may vary in at least one direction. For example, the skin sections 16 may vary in depth D such that the skin covering 56 varies in thickness along a surface area of the animatronic FIG. 60. In this manner, the differing thicknesses of real skin may be advantageously mimicked in the animatronic FIG. 60. For example with reference to an animatronic elephant 60, the skin covering 56 may be thicker along the back ridge and foot pads, but the skin covering 56 may be thinner along the stomach area. Similarly, the skin covering 56 may be thinner adjacent a prominent bone structure and thicker adjacent a predominant soft tissue area. In this manner, the look and feel of real skin, as well as the underlying bone and tissue structure, may be simulated in the animatronic FIG. 60 by the biomimetic skin 10.

In some embodiments, the skin sections 16 may vary in length L and width W to accommodate for the size and shape of the animatronic FIG. 60. Again with reference to an animatronic elephant 60, relatively large skin sections 16A may be sized to substantially cover large sections of the animatronic FIG. 60 having relatively flat or simple geometry (e.g., an elephant's side). Contrastingly, relatively small skin sections 16B may be sized for areas of the animatronic FIG. 60 having complex geometry (e.g., the face or shoulders of an elephant).

The foregoing description has broad application. While the provided embodiments describe a biomimetic skin for an animatronic figure, it should be appreciated that the concepts disclosed herein may equally apply to many types of artificial skins, including skins for mannequins, prosthetics, robots, and any other movable or non-movable device wherein the look and feel of real skin is desired. Accordingly, the discussion of any embodiment is meant only to be explanatory and is not intended to suggest that the scope of the disclosure, including the claims, is limited to these examples. In other words, while illustrative embodiments of the disclosure have been described in detail herein, the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

All directional references (e.g., distal, upper, lower, upward, left, right, lateral, front, back, top, bottom, outer, inner, below) are only used for identification purposes to aid the reader's understanding of the present disclosure and drawings and not as limitations. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., first, second, etc.) are not intended to connote importance or priority, but are used to distinguish one feature from another. The drawings are for purposes of illustration only and the dimensions, positions, order and relative sizes reflected in the drawings attached hereto may vary.

What is claimed is:

1. A biomimetic skin comprising:
   a nonporous outer layer having a surface texture; and
   a porous inner layer attached to a surface of the outer layer, the inner layer comprising a compressible cellular material having a plurality of three dimensional cells, each cell defining a void arranged to allow air to move through the inner layer, wherein the cells are arranged in an orderly and repeating pattern, the cellular material including a top surface, a bottom surface, and one or more compressible elements extending between the top surface and the bottom surface, wherein the top surface and the bottom surface are a mesh material, and wherein the one or more compressible elements are monofilament fibers.

2. The biomimetic skin of claim 1, wherein:
the inner layer extends substantially parallel to at least a portion of the outer layer; and
the one or more compressible elements extend non-parallel to the top and bottom surfaces.

3. The biomimetic skin of claim 1, wherein a thickness of the inner layer is greater than a thickness of the outer layer.

4. The biomimetic skin of claim 1, wherein the biomimetic skin is stretchable in at least one lateral direction and is compressible in at least one transverse direction.

5. The biomimetic skin of claim 4, wherein the biomimetic skin is compressible in at least one lateral direction.

6. The biomimetic skin of claim 1, further comprising fibrous material extending away from the outer layer.

7. The biomimetic skin of claim 1, wherein at least a portion of the inner layer is embedded into the outer layer.

8. A multi-layer artificial skin comprising:
a nonporous dermis layer; and
a porous hypodermis layer connected to a surface of the dermis layer, the hypodermis layer comprising a cellular structure having a plurality of cells, each cell defining an air pocket arranged to allow air to flow through the hypodermis layer, wherein the plurality of cells are arranged in an orderly and repeating three dimensional pattern, the cellular structure including a top surface, a bottom surface, and a plurality of monofilament fibers extending between the top surface and the bottom surface, wherein the top surface and the bottom surface are a mesh material.

9. The multi-layer artificial skin of claim 8, wherein the fibers are a different material from the bottom surface.

10. A skin for an animatronic figure, the skin comprising:
an impermeable outer layer made from a rubber or silicone material, wherein the outer layer includes a surface texture mimicking a skin appearance of a human or animal; and
a permeable inner layer attached to a surface of the outer layer, the inner layer made from a textile material defining a plurality of three dimensional air chambers arranged to allow air to move through the inner layer, wherein the plurality of air chambers are arranged in an orderly and repeating pattern, the textile material including a first surface, a second surface, and a plurality of monofilament fibers extending between the first and second surfaces, wherein the first and second surfaces are a mesh material.

11. The skin of claim 10, wherein the textile material is a 3D spacer fabric, wherein the plurality of fibers are formed of a different material from the first surface and the second surface, and wherein the fibers define the plurality of air chambers between the first surface and the second surface.

12. The skin of claim 11, wherein the outer layer is made from styrene butadiene rubber.

13. The skin of claim 12, wherein the layers are resiliently deformable in at least two directions.

14. An animatronic figure comprising:
a support frame; and
at least one biomimetic skin section attached to the support frame, the at least one biomimetic skin section comprising:
a nonporous first layer; and
a porous second layer attached to a surface of the first layer to be positioned at least partially between the first layer and the support frame, and at least partially connected to the first layer and the support frame, the second layer including a cellular structure defining a plurality of voids arranged to allow air to flow through the second layer, wherein the plurality of voids are arranged in an orderly and repeating pattern, the second layer including a top surface, a bottom surface, and one or more monofilament fibers extending between the top and bottom surfaces, wherein the top and bottom surfaces are a mesh material.

15. The animatronic figure of claim 14, wherein the cellular structure is operable to allow air to flow through the second layer to control a temperature of the at least one biomimetic skin section.

16. The animatronic figure of claim 14, wherein fasteners extend through at least a portion of the second layer to connect the at least one biomimetic skin section to the support frame.

17. The animatronic figure of claim 14, wherein a plurality of biomimetic skin panels are connected together to form a skin at least partially covering the support frame of the animatronic figure.

18. The animatronic figure of claim 17, wherein the skin varies in thickness along a surface area of the animatronic figure.

19. A method of fabricating a multi-layered biomimetic skin, the method comprising:
forming a skin mold having a cavity defined by a bottom wall and generally parallel sidewalls extending from the bottom wall, the bottom wall including a texture region;
filling a first material for a nonporous exterior skin layer into the skin mold to occupy at least a portion of the cavity; and
attaching a second material for a porous interior skin layer to the first material, the second material including a cellular structure defining a plurality of chambers arranged to allow air to move through the second material, wherein the plurality of chambers are arranged in a geometric pattern, the second material including a top surface, a bottom surface, and one or more monofilament fibers extending between the top and bottom surfaces, wherein the top and bottom surfaces are a mesh material.

20. The method of claim 19, further comprising:
cooling the first material to a cooling temperature; and
removing the first material from the skin mold.

21. The method of claim 20, wherein the second material is attached to the first material before the first material is removed from the skin mold.

22. The method of claim 20, wherein attaching a second material to the first material includes:
heating the first material to a forming temperature; and
bonding the second material to the first material such that the second material is at least partially embedded into the first material.

* * * * *